United States Patent
Beesetti et al.

(10) Patent No.: US 10,546,280 B2
(45) Date of Patent: Jan. 28, 2020

(54) VIRTUAL ATM—REMOTELY ACCESSING

(71) Applicant: International Business Machines Corporation, Armonk, NY (US)

(72) Inventors: Satish K. Beesetti, Visakhapatnam (IN); Paul D. Perumal, Visakhapatnam (IN); Kamal Ramineedi, Visakhapatnam (IN); Kamal K. Yamala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 15/333,243

(22) Filed: Oct. 25, 2016

(65) Prior Publication Data
US 2018/0114208 A1    Apr. 26, 2018

(51) Int. Cl.
G06Q 20/10    (2012.01)
G07F 19/00    (2006.01)
G06Q 20/32    (2012.01)

(52) U.S. Cl.
CPC ..... *G06Q 20/1085* (2013.01); *G06Q 20/3223* (2013.01); *G07F 19/21* (2013.01)

(58) Field of Classification Search
CPC ........... G06Q 20/1085; G06Q 20/3223; G06Q 20/18; G06Q 20/38215; G06Q 20/385;
(Continued)

(56) References Cited

U.S. PATENT DOCUMENTS 7,980,462 B1 * 7/2011 Graef ................ G06Q 20/1085
235/379
8,172,130 B2    5/2012 Drummond et al.
(Continued)

FOREIGN PATENT DOCUMENTS

| WO | 2009089729 A1 | 7/2009 | |
|---|---|---|---|
| WO | WO-2010106340 A1 * | 9/2010 | ............. G06Q 20/32 |
| WO | WO-2014092664 A1 * | 6/2014 | ............. G07F 19/20 |

OTHER PUBLICATIONS

Gebad et al.: ATM Transaction without Debit Card, Jul. 2016, International Journal of Advanced Research in Computer and Communication Engineerig (IJARCCE), vol. 5, Issue 7, pp. 1-4. (Year: 2016).*

(Continued)

*Primary Examiner* — Bijendra K Shrestha
(74) *Attorney, Agent, or Firm* — North Shore Patents, P.C.; Joseph L. Acayan

(57) ABSTRACT

A system remotely accesses an Automated Teller Machine (ATM) machine by detecting insertion of a customer bank card into the ATM. The insertion of the customer bank card is detected by the ATM. The system initiates a connection to a mobile device upon the detection of the insertion. The system then unlocks the ATM when the mobile device accepts the connection, and unlocks the ATM when a banking transaction has been completed, where the banking transaction completed by a remote user operating the mobile device. The system automatically disconnects the connection to the mobile device, and automatically unlocks the ATM after a predetermined time period has elapsed. The system automatically ejects the customer bank card from the ATM when the ATM is automatically unlocked.

14 Claims, 3 Drawing Sheets

(58) Field of Classification Search
CPC .............................................. G06Q 20/4012;
G06Q 20/425; G07F 19/206; G07F 19/21
See application file for complete search history.

(56) References Cited

U.S. PATENT DOCUMENTS

| | | | | |
|---|---|---|---|---|
| 8,332,320 | B2* | 12/2012 | Singh | G06Q 20/1085 |
| | | | | 705/1.1 |
| 8,955,743 | B1 | 2/2015 | Block et al. | |
| 9,026,461 | B2* | 5/2015 | Calman | G07F 19/201 |
| | | | | 705/18 |
| 9,595,065 | B2* | 3/2017 | Pradeep | G06Q 20/10 |
| 9,792,594 | B1* | 10/2017 | Bayha | G06Q 20/1085 |
| 2007/0260557 | A1* | 11/2007 | Vityaz | G06Q 10/10 |
| | | | | 705/76 |
| 2012/0265679 | A1 | 10/2012 | Calman et al. | |
| 2012/0314862 | A1* | 12/2012 | Min | H04L 9/3215 |
| | | | | 380/255 |
| 2016/0078417 | A1 | 3/2016 | DeLuca et al. | |
| 2016/0078528 | A1 | 3/2016 | Pradeep et al. | |
| 2017/0243447 | A1* | 8/2017 | Block | G07F 19/211 |
| 2017/0262664 | A1* | 9/2017 | Leiponis | G06K 7/0004 |
| 2018/0096322 | A1 | 4/2018 | D'Agostino et al. | |

OTHER PUBLICATIONS

Sifat et al.: Virtual ATM: A Low Cost Secured Alternative to Conventional Mobile Banking, 2015, International Journal of InteractiveMobile Technologies (iJIM), vol. 9, No. 2, pp. 1-7. (Year: 2015).*

Anonymous, "Now, withdraw cash from ICIC Bank ATMs without a card", http://timesofindia.indiatimes.com/business/india-business/Now-withdraw-cash-from-ICIC-Bank-ATMs-without-a-card/articleshow/42175084.cms, downloaded Jul. 28, 2016.

Anonymous, "Withdraw Cash Without a Card", http://www.icicibank.com/Personal-Banking/insta-banking/internet-banking/cardless-cash-withdrawal.page, downloaded Jul. 28, 2016.

Hubbard, "How to Withdraw Money Without an ATM Card", http://classroom.synonym.com/withdraw-money-atm-card-12278.html, downloaded Jul. 28, 2016.

* cited by examiner

VIRTUAL ATM—REMOTELY ACCESSING

BACKGROUND

Automated Teller Machines (ATMs) provide a convenience of obtaining cash without being restricted to bank locations, and the hours when those banks are open. While many people could benefit from this convenience, not everyone is familiar or comfortable with the technology and knowledge needed to operate an ATM to obtain cash. Therefore, it would be helpful to have a way to remotely access an ATM to assist those people who are not familiar or comfortable with operating an ATM.

SUMMARY

According to an embodiment of the present invention, in a method for remotely accessing an Automated Teller Machine (ATM) machine, the method, via the ATM, detects insertion of a customer bank card into the ATM. The method initiates a connection to a mobile device upon the detection of the insertion. The method locks the ATM when the mobile device accepts the connection, and unlocks the ATM when a banking transaction has been completed, where the banking transaction is completed by a remote user operating the mobile device. The method automatically disconnects the connection to the mobile device, and automatically unlocks the ATM after a predetermined time period has elapsed. The method automatically ejects the customer bank card from the ATM when the ATM is automatically unlocked.

In an example embodiment, when the method initiates the connection to the mobile device upon the detection of the insertion of the bank card, the method initiates the connection to at least one mobile device that is linked to the customer bank card.

In an example embodiment, when the method initiates the connection to the mobile device upon the detection of the insertion of the bank card, the method initiates a phone call to the mobile device. When the method locks the ATM when the mobile device accepts the connection, the method locks the ATM when a remote user answers the phone call on the mobile device.

In an example embodiment, when the method initiates the connection to the mobile device upon the detection of the insertion of the bank card, the method initiates the connection to an application installed on the mobile device. When the method locks the ATM when the mobile device accepts the connection, the method locks the ATM when a remote user invokes the application installed on the mobile device.

In an example embodiment, when the method initiates the connection to the mobile device upon the detection of the insertion of the bank card, the method establishes a secure connection between the mobile device and the ATM while the ATM is locked.

In an example embodiment, when the method unlocks the ATM when the banking transaction has been completed, where the banking transaction is completed by the remote user operating the mobile device, the method unlocks the ATM when the banking transaction has been completed within a predetermined transaction time period.

In an example embodiment, when the method unlocks the ATM when the banking transaction has been completed, where the banking transaction is completed by the remote user operating the mobile device, the method sends notification to the remote user that cash has been dispensed from the ATM.

In an example embodiment, when the method unlocks the ATM when the banking transaction has been completed, where the banking transaction is completed by the remote user operating the mobile device, the method ejects the customer bank card from the ATM when the ATM is unlocked.

DETAILED DESCRIPTION

Figure 1:
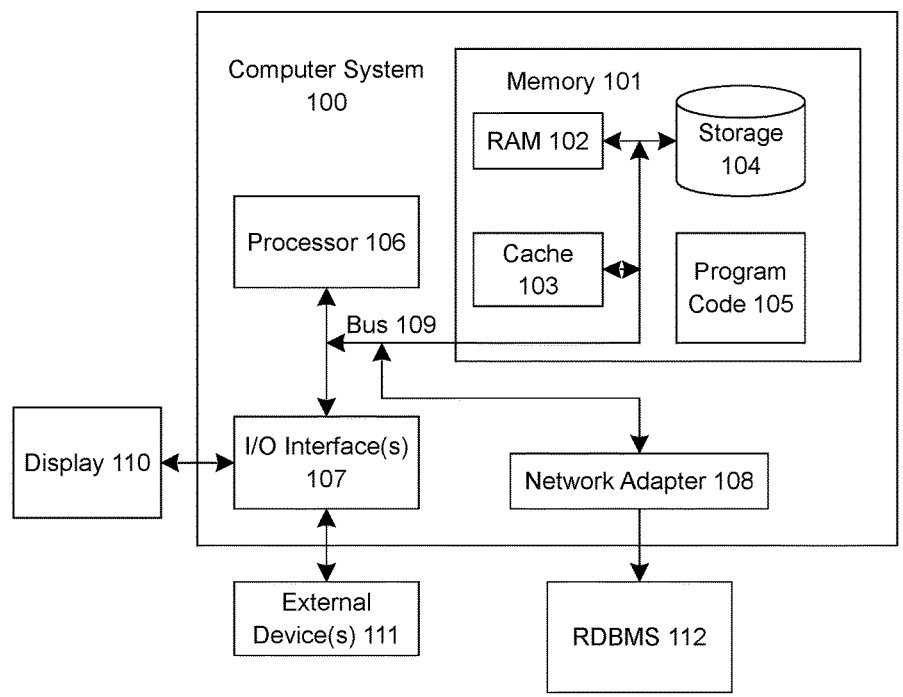
FIG. 1 illustrates an embodiment of a system for remotely accessing an Automated Teller Machine (ATM) machine, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for sorting for automating localization of information for smart appliances according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
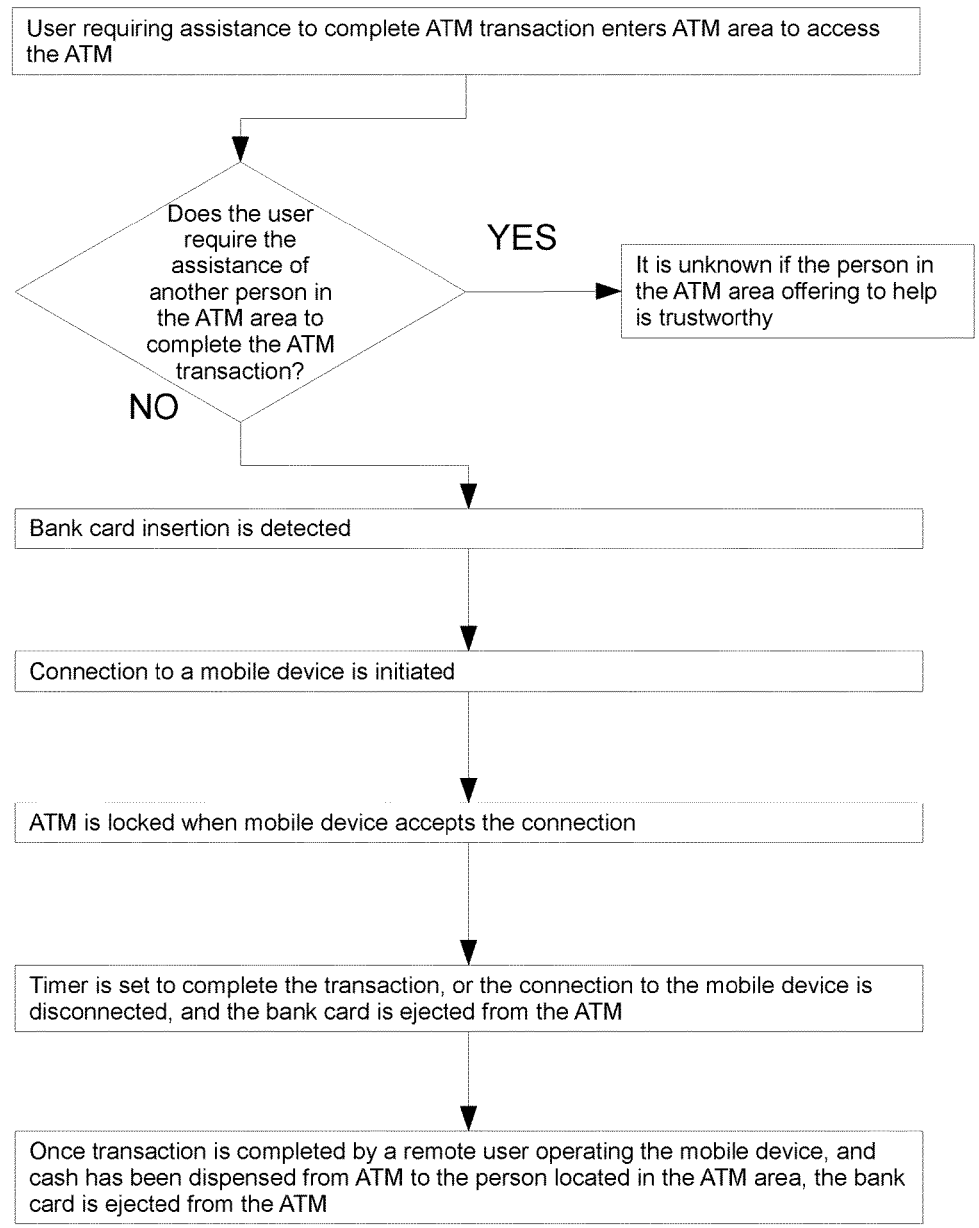
FIG. 2 is an example representation of a high level view of a system for remotely accessing an ATM machine, according to embodiments disclosed herein.

FIG. 2 is an example representation of a high level view of a system for remotely accessing an ATM machine, according to embodiments disclosed herein. In an example embodiment, a user requiring assistance to complete an ATM transaction enters the ATM area to access the ATM. For example, the user might not be able to physically operate the ATM, such as a visually impaired user, or a user who has difficulty using their hands. If the user requires assistance to complete the ATM transaction, the user might ask a nearby person to assist the user. The user, however, may find it awkward to approach the nearby person and ask him/her for assistance. If the user does not speak the local language, the user may be unable to communicate with the nearby person to ask for assistance to complete the transaction. If the nearby person is not trustworthy, the user might be in danger of being robbed. There is no way of knowing if the nearby people who offer to help have good intentions or not. Instead, using embodiments disclosed herein, the user has the option of remote assistance from a trustworthy person who completes the ATM transaction remotely on the behalf of the user. The user inserts his/her bank card into the ATM machine. The method detects the insertion of the bank card. Upon insertion of the bank car, a connection to a mobile device is initiated. The mobile device is associated with a person (i.e., a remote user) who the user trusts to complete the ATM transaction on the behalf of the user. When the mobile device accepts the connection, the ATM is locked.

Thus, no other person may access the ATM and/or the customer bank card while the ATM is locked. A timer is set for completing the transaction. If the transaction is not completed by the time the timer goes off, the connection to the mobile device is disconnected, and the bank card is ejected from the ATM. Otherwise, the remote user completes the ATM transaction, via the mobile device within a predetermined time period. Once the ATM transaction is completed, and the cash has been dispensed from the ATM machine, the ATM machine is unlocked, and the bank card is automatically ejected from the ATM machine. The remote user receives notification when the cash is dispensed from the ATM.

Figure 3:
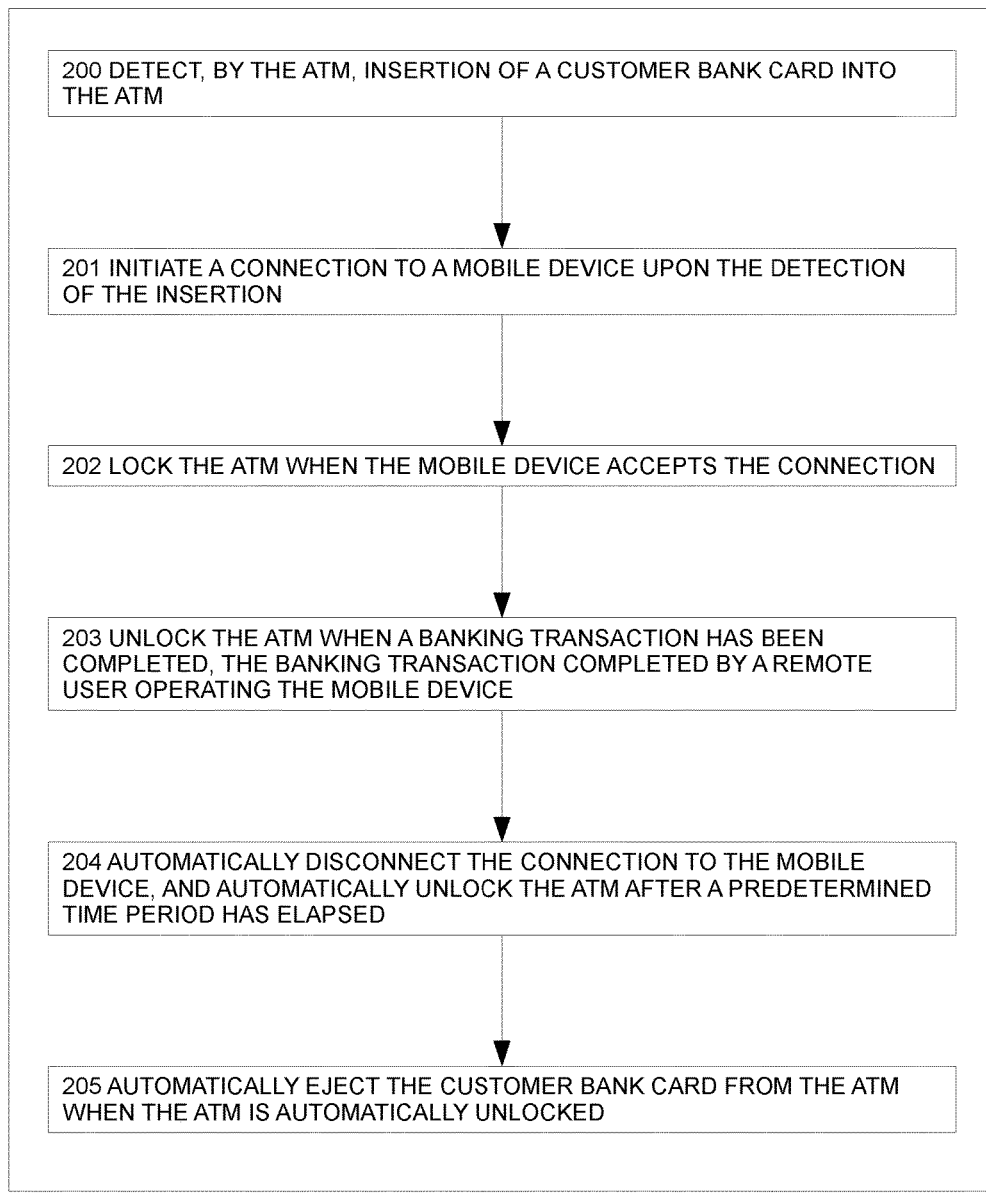
FIG. 3 is a flowchart illustrating an embodiment of a method for remotely accessing an ATM machine, according to embodiments disclosed herein.

FIG. 3 illustrates an example embodiment of a method for remotely accessing an ATM machine. At 200, the method detects insertion of a customer bank card into the ATM. For example, the user inserts the customer bank card into the ATM. At 201, upon the detection of the insertion of the customer bank card, the method initiates a connection to a mobile device. In an example embodiment, a user enters the ATM area, and inserts a customer bank card into the ATM. The method detects the insertion of the customer bank card, and automatically initiates a connection to a mobile device when the insertion of the customer bank card is detected by the ATM machine. At 202, the method locks the ATM when the mobile device accepts the connection. In an example embodiment, when the ATM is locked, the user may not remove the customer bank card from the ATM. At 203, the method unlocks the ATM when a banking transaction has been completed, where the banking transaction completed by a remote user operating the mobile device. In other words, the remote user completes the transaction on behalf of the user who is located in the ATM area. When the transaction is completed, the ATM machine dispenses cash to the user located in the ATM area. The remote user is notified that the cash has been dispensed from the ATM. In another example embodiment, the transaction may be any type of transaction that may be performed at an ATM machine. At 204, the method automatically disconnects the connection to the mobile device, and automatically unlocks the ATM after a predetermined time period has elapsed, for example, if the transaction has not been completed within the predetermined time period. At 205, the method automatically ejects the customer bank card from the ATM when the ATM is automatically unlocked. In an example embodiment, after a predetermined time period has elapsed, for example, four minutes, the method automatically disconnects the connection to the mobile device, and automatically unlocks the ATM. When the method unlocks the ATM, the method automatically ejects the customer bank card from the ATM. In other words, if there are problems completing the transaction, the method unlocks the ATM, returns the customer bank card to the customer, and frees up the ATM machine for a subsequent transaction, for example, by the user, or a different ATM customer.

In an example embodiment, when the method initiates the connection to the mobile device upon the detection of the insertion, the method initiates the connection to at least one mobile device that is linked to the customer bank card. For example, the customer bank card may be linked to one or more mobile devices such that a user (who has difficulty completing transactions at an ATM machine) has remote users available that assist the user in completing the ATM transactions, and these remote users are people who the user can trust. In an example embodiment, the user, and/or the remote user may register the mobile phone number with the customer bank card. The mobile device may be any type of personal device, and the connection may be any type of connection.

In an example embodiment, when the method initiates the connection to the mobile device upon the detection of the insertion, the method initiates a phone call to the mobile device. When the mobile device accepts the connection, the method locks the ATM. For example, the method locks the ATM when a remote user answers the phone call on the mobile device.

In an example embodiment, when the method initiates the connection to the mobile device upon the detection of the insertion, the method initiates the connection to an application installed on the mobile device. When the mobile device accepts the connection, the method locks the ATM. In an example embodiment, the method locks the ATM when a remote user invokes the application installed on the mobile device. For example, when the method initiates a connection to the mobile device, and the mobile device accepts the connection, an application on the mobile device is invoked. The application allows the remote user to complete the ATM transaction. If the application is not installed on the mobile device of the remote user, the connection to the mobile device, initiated by the method, will be ignored by the mobile device.

In an example embodiment, when the method initiates the connection to the mobile device upon the detection of the insertion, the method establishes a secure connection between the mobile device and the ATM while the ATM is locked. The secure connection may be any type of connection. Thus, the privacy and security of the customer bank card information and/or Personal Identification Number (PIN) number is protected during the transaction. In an example embodiment, an encrypted code is sent to the remote user. To complete the transaction, the remote user must enter the encrypted code, along with the PIN while performing the transaction.

In an example embodiment, when the transaction has been completed, the method unlocks the ATM. For example, the banking transaction is completed by the remote user operating the mobile device. The banking transaction may be completed by the remote user and/or the user located in the ATM area. For example, the remote user may perform all aspects of the transaction, or the remote user may oversee the transaction while the user located in the ATM area performs the transaction, or both the remote user and the user located in the ATM may each perform part of the transaction. The method then unlocks the ATM when the banking transaction has been completed within a predetermined transaction time period. For example, once the connection is accepted by the mobile device, the method locks the ATM. The remote user then completes the transaction using the mobile device. The transaction is completed on behalf of the user. If the transaction is completed (for example, cash is dispensed from the ATM to the user located in the ATM area) within a predetermined period of time, the method notifies the remote user, via the mobile device, that the cash was dispensed from the ATM. The method then unlocks the ATM and releases/ejects the customer bank card. In an example embodiment, the transaction must be completed within a predetermined period of time, for example, four minutes.

In an example embodiment, when the method unlocks the ATM when the banking transaction has been completed, where the transaction completed by the remote user operating the mobile device, the remote user receives notification that cash has been dispensed from the ATM. For example, when the transaction is completed by the remote user operating the mobile device, the user located in the ATM are receives the cash dispensed from the ATM. The method then unlocks the ATM. The method then notifies the remote user that cash has been dispensed from the ATM.

In an example embodiment, when the method unlocks the ATM when the banking transaction has been completed, where the transaction completed by the remote user operating the mobile device, the method ejects the customer bank card from the ATM when the ATM is unlocked. For example, when the transaction is completed by the remote user operating the mobile device, the ATM is unlocked, and the customer bank card is ejected/released from the ATM.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of remotely accessing an Automated Teller Machine (ATM) machine, the method comprising:
   detecting, by the ATM, insertion of a customer bank card into the ATM;
   initiating a connection to a mobile device upon the detection of the insertion;
   locking the ATM when the mobile device accepts the connection;
   unlocking the ATM when a banking transaction has been completed, the banking transaction completed by a remote user operating the mobile device;
   if the banking transaction has not been completed within a predetermined time period, disconnecting the connection to the mobile device and unlocking the ATM; and
   ejecting the customer bank card from the ATM when the ATM is unlocked.

2. The method of claim 1 wherein initiating the connection to the mobile device upon the detection of the insertion comprises:
   initiating the connection to at least one mobile device that is linked to the customer bank card.

3. The method of claim 1 wherein initiating the connection to the mobile device upon the detection of the insertion comprises:
   initiating a phone call to the mobile device; and
   wherein locking the ATM when the mobile device accepts the connection comprises:
   locking the ATM when a remote user answers the phone call on the mobile device.

4. The method of claim 1 wherein initiating the connection to the mobile device upon the detection of the insertion comprises:
   initiating the connection to an application installed on the mobile device; and
   wherein locking the ATM when the mobile device accepts the connection comprises:
   locking the ATM when a remote user invokes the application installed on the mobile device.

5. The method of claim 1 wherein initiating the connection to the mobile device upon the detection of the insertion comprises:
   establishing a secure connection between the mobile device and the ATM while the ATM is locked.

6. The method of claim 1 wherein unlocking the ATM when the banking transaction has been completed, the banking transaction completed by the remote user operating the mobile device comprises:
   unlocking the ATM when the banking transaction has been completed within a predetermined transaction time period.

7. The method of claim 1 wherein unlocking the ATM when the banking transaction has been completed, the banking transaction completed by the remote user operating the mobile device comprises:
   receiving notification, by the remote user, that cash has been dispensed from the ATM.

8. The method of claim 1 wherein unlocking the ATM when the banking transaction has been completed, the banking transaction completed by the remote user operating the mobile device comprises:
   ejecting the customer bank card from the ATM when the ATM is unlocked.

9. A computer program product for remotely accessing an Automated Teller Machine (ATM) machine, the computer program product comprising:
   a non-transitory computer readable storage medium having computer readable program code embodied therewith, the program code executable by a computer processor to:
   detect, by the ATM, insertion of a customer bank card into the ATM;
   initiate a connection to a mobile device upon the detection of the insertion;
   lock the ATM when the mobile device accepts the connection;
   unlock the ATM when a banking transaction has been completed, the banking transaction completed by a remote user operating the mobile device;
   if the banking transaction has not been completed within a predetermined time period, disconnecting the connection to the mobile device and unlocking the ATM; and
   ejecting the customer bank card from the ATM when the ATM is unlocked.

10. The computer program product of claim 9 wherein the computer readable program code configured to initiate the connection to the mobile device upon the detection of the insertion is further configured to:
    establish secure connection between the mobile device and the ATM while the ATM is locked.

11. The computer program product of claim 9 wherein the computer readable program code configured to unlock the ATM when the banking transaction has been completed, the banking transaction completed by the remote user operating the mobile device is further configured to:
    eject the customer bank card from the ATM when the ATM is unlocked.

12. A system comprising:
    a computing processor; and
    a non-transitory computer readable storage medium operationally coupled to the processor, the computer readable storage medium having computer readable program code embodied therewith to be executed by the computing processor, the computer readable program code configured to:

detect, by the ATM, insertion of a customer bank card into the ATM;

initiate a connection to a mobile device upon the detection of the insertion;

lock the ATM when the mobile device accepts the connection;

unlock the ATM when a banking transaction has been completed, the banking transaction completed by a remote user operating the mobile device;

if the banking transaction has not been completed within a predetermined time period, disconnecting the connection to the mobile device and unlocking the ATM; and ejecting the customer bank card from the ATM when the ATM is unlocked.

13. The system of claim 12 wherein the computer readable program code configured to initiate the connection to the mobile device upon the detection of the insertion is further configured to:

establish a secure connection between the mobile device and the ATM while the ATM is locked.

14. The system of claim 12 wherein the computer readable program code configured to unlock the ATM when the banking transaction has been completed, the banking transaction completed by the remote user operating the mobile device is further configured to:

eject the customer bank card from the ATM when the ATM is unlocked.

* * * * *